(12) United States Patent
Kawamura

(10) Patent No.: US 9,205,747 B2
(45) Date of Patent: Dec. 8, 2015

(54) HYBRID CIRCUIT

(75) Inventor: Yoshihiro Kawamura, Shizuoka-ken (JP)

(73) Assignee: Yazaki Corporation, Tokyo (JP)

( * ) Notice: Subject to any disclaimer, the term of this patent is extended or adjusted under 35 U.S.C. 154(b) by 708 days.

(21) Appl. No.: 13/534,534

(22) Filed: Jun. 27, 2012

(65) Prior Publication Data
US 2013/0002018 A1 Jan. 3, 2013

(30) Foreign Application Priority Data
Jun. 28, 2011 (JP) ................. P2011-142597

(51) Int. Cl.
*H02J 1/00* (2006.01)
*H02J 3/30* (2006.01)
*B60L 3/00* (2006.01)
*B60L 11/18* (2006.01)

(52) U.S. Cl.
CPC ........... *B60L 3/0046* (2013.01); *B60L 11/1859* (2013.01); *Y02T 10/7005* (2013.01); *Y02T 10/705* (2013.01); *Y02T 10/7011* (2013.01); *Y10T 307/406* (2015.04)

(58) Field of Classification Search
CPC .............. Y02T 10/7005; Y02T 10/705; Y02T 10/7011; B60L 11/1859; B60L 3/0046; H02J 1/04
USPC .......................................................... 307/75
See application file for complete search history.

(56) References Cited

U.S. PATENT DOCUMENTS

| 4,780,795 | A | * | 10/1988 | Meinel | 361/765 |
|---|---|---|---|---|---|
| 5,736,774 | A | * | 4/1998 | Fujihira | 257/500 |
| 6,215,681 | B1 | * | 4/2001 | Schuurman et al. | 363/141 |
| 6,259,157 | B1 | * | 7/2001 | Sakamoto et al. | 257/723 |
| 7,834,575 | B2 | * | 11/2010 | Hauenstein | 318/569 |
| 2005/0231925 | A1 | | 10/2005 | Fukuda et al. | |
| 2009/0243764 | A1 | | 10/2009 | Hauenstein | |
| 2010/0202124 | A1 | | 8/2010 | Kawamura | |

FOREIGN PATENT DOCUMENTS

| CN | 101442211 A | 5/2009 |
|---|---|---|
| EP | 1 100 294 A2 | 5/2001 |
| JP | 11-176479 | 7/1999 |
| JP | 2005-123239 A | 5/2005 |
| JP | 2005-257865 A | 9/2005 |
| JP | 2006-9687 | 1/2006 |
| JP | 2009-108719 | 5/2009 |
| WO | WO 2011-078404 A2 | 6/2011 |

OTHER PUBLICATIONS

Office Action issued May 4, 2014 in the counterpart Chinese patent application No. 201210214639.0.
Communication dated Dec. 29, 2014 from the State Intellectual Property Office of People's Republic of China in counterpart Application No. 201210214639.0.
Communication dated May 12, 2015 from the German Patent Office in counterpart application No. 102012105513.0.
Communication dated Jun. 25, 2015 from the State Intellectual Property Office of the P.R.C. in counterpart application No. 201210214639.0.

* cited by examiner

*Primary Examiner* — Jared Fureman
*Assistant Examiner* — Esayas Yeshaw
(74) *Attorney, Agent, or Firm* — Sughrue Mion, PLLC

(57) ABSTRACT

In a hybrid circuit including a high-voltage circuit and a low-voltage circuit having different power supply voltages from each other, a voltmeter serving as a high-voltage circuit, a high-voltage connector for connecting the voltmeter and the lithium ion battery, the control unit which is a part of the low-voltage circuit and performs switching control to turn on/off internal switches of the voltmeter are mounted on a hybrid integrated circuit. Then, the hybrid integrated circuit is stacked on top of a hybrid integrated circuit mounting area of a low-voltage substrate on which the rest of the low-voltage circuit is mounted.

8 Claims, 6 Drawing Sheets

HYBRID CIRCUIT

BACKGROUND OF THE INVENTION

1. Field of the Invention

The present invention relates to a hybrid circuit including a high-voltage circuit and a low-voltage circuit which have different power-supply voltages from each other.

2. Description of the Related Art

As a hybrid circuit including a high-voltage circuit and a low-voltage circuit having different power-supply voltages from each other, hybrid circuits described in JP 11-176479 A (Patent Literature 1) and JP 2006-009687 A (Patent Literature 2) have been proposed. According to the Patent Literature 1 and the Patent Literature 2, a high-voltage circuit and a low-voltage circuit are mounted on different substrates, respectively, and these substrates are located by being stacked in a hierarchy manner, thus suppressing an increase in a layout area of the substrates.

SUMMARY OF THE INVENTION

Examples of fields where a hybrid circuit having a high-voltage circuit and a low-voltage circuit is used include vehicles such as electric vehicles (EVs), hybrid electric vehicles (HEVs, vehicles using an engine in combine with a motor generator), and the like. In vehicles such as EVs and HEVs, a low-voltage circuit, which operates with a same voltage as conventional vehicles powered by an engine (for example, an effective voltage of 12V), is provided in relation to a control system and in-vehicle electric components. Also, a high-voltage circuit, which operates with a voltage higher than the low-voltage circuit (for example, an effective voltage of 200V), is provided in relation to a motor (or a motor generator) which serves as a power source and peripheral equipment thereof.

In a hybrid circuit used in EVs and HEVs, it is especially important to take measures to prevent abnormal electrical discharge caused by short circuit. The reason is that in-vehicle batteries are shifting from lead-acid batteries to high-voltage lithium ion batteries. This means that, an abnormal electrical discharge creates more damage to battery functions of a lithium-ion battery than to a lead-acid battery, and a lithium-ion battery generates more heat in itself and the wiring thereof than a lead-acid battery when abnormal electrical discharge happens.

Also, in fields other than vehicles, even more attention needs to be paid to designing of circuits and substrates of a hybrid circuit having a high-voltage circuit and a low-voltage circuit in order to prevent short circuit, compared to a case where a single low-voltage circuit is mounted on a substrate. This is important regardless of whether a lithium-ion battery, which receives a significant damage from short circuit, is used as a power source or not.

In that regard, while the Patent Literature 1 and the Patent Literature 2 stated above propose measures in design to suppress a layout area of substrates, aforementioned countermeasures against short circuit are not proposed therein.

Further, in above-mentioned conventional hybrid circuit having a high-voltage circuit and a low-voltage circuit, the high-voltage circuit and the low-voltage circuit which controls operations of the high-voltage circuit were mounted on separate substrates, respectively. Therefore, when a high-voltage circuit had a design change, there was a problem in that the entire hybrid circuit had to be changed.

The present invention has been accomplished in order to solve the aforementioned problems in the prior arts, and an object thereof is to provide a hybrid circuit which prevents an increase in layout area and occurrence of short circuit and has a high-voltage circuit and a low-voltage circuit that are versatile.

In order to attain the above object, a hybrid circuit according to a first aspect of the present invention is a hybrid circuit including a high-voltage circuit and a low-voltage circuit having different power supply voltages from each other, the hybrid circuit including a low-voltage substrate on which a connector for a low-voltage system for electrically connecting an external low-voltage element to the low-voltage circuit is mounted, and a substrate-shaped hybrid integrated circuit which can be stacked on the low-voltage substrate. The low-voltage circuit includes a control unit which controls an operation of the high-voltage circuit. The control unit, the high-voltage circuit, and a connector for a high-voltage system for electrically connecting an external high-voltage element to the high-voltage circuit are mounted on the hybrid integrated circuit.

This means that, the hybrid integrated circuit, on which the high-voltage circuit and the connector for the high-voltage system for connecting the external high-voltage element to the high-voltage circuit are mounted, is stacked on the low-voltage substrate on which the connector for the low-voltage system for connecting the external low-voltage element to the low-voltage circuit is mounted. Therefore, an area required for the entire integrated hybrid circuit does not becomes larger than a case where all the constituent elements of the hybrid circuit are mounted on a single substrate.

Moreover, the high-voltage circuit is mounted on the hybrid integrated circuit. Therefore, a short circuit fault can be prevented from happening due to a foreign matter mixed into the high-voltage circuit.

Further, the control unit which controls an operation of the high-voltage circuit, the high-voltage circuit, and the connector for a high-voltage system are mounted on the hybrid integrated circuit. Therefore, by replacing the hybrid integrated circuit into something else, the high-voltage circuit and the control unit thereof, as well as the connector for a high-voltage system can be changed into different specifications. Hence, when there is a design change in the high-voltage circuit, the change can be made only by replacing the hybrid integrated circuit without changing the entire hybrid circuit. This makes it possible to provide the hybrid circuit having the high-voltage circuit and the low-voltage circuit which are versatile.

Thus, the hybrid circuit can be provided which prevents an increase in a layout area and occurrence of short circuit and has versatile high-voltage circuit and low-voltage circuit.

It is preferred that at least part of the connector for a high-voltage system be arranged on a surface side of the hybrid integrated circuit opposed to a surface of the same which faces the low-voltage substrate, in a direction of an interval between the low-voltage substrate and the hybrid integrated circuit.

With this structure, even when a dimension of the connector for the high-voltage system exceeds the interval between the low-voltage substrate and the hybrid integrated circuit, it becomes possible to arrange the connector for the high-voltage system without increasing the interval between the low-voltage substrate and the hybrid integrated circuit. In other words, the low-voltage substrate and the hybrid integrated circuit can be arranged at a shorter interval than the dimension of the connector for the high-voltage system. Hence, downsizing of the entire hybrid circuit can be achieved.

It is preferred that the high-voltage circuit and the connector for the high-voltage system be arranged on one of a pair of sides of the hybrid integrated circuit which face each other, and the control unit is arranged on the other of the pair of sides.

With this structure, the high-voltage circuit and the connector for the high-voltage system can be arranged physically distanced from the control unit for the low-voltage circuit. Thus, an appropriate layout for preventing short circuit between the high-voltage circuit and the low-voltage circuit can be realized.

Accordance with the first aspect of the present invention, the hybrid circuit can be provided which prevents an increase in a layout area and occurrence of short circuit, and has versatile high-voltage circuit and low-voltage circuit.

DESCRIPTION OF THE EMBODIMENTS

An embodiment of the present invention will be explained below with reference to the drawings.

First, a mounting structure of a hybrid circuit according to the embodiment will be described with reference to FIGS. 1, 2A and 2B.

Figure 1:
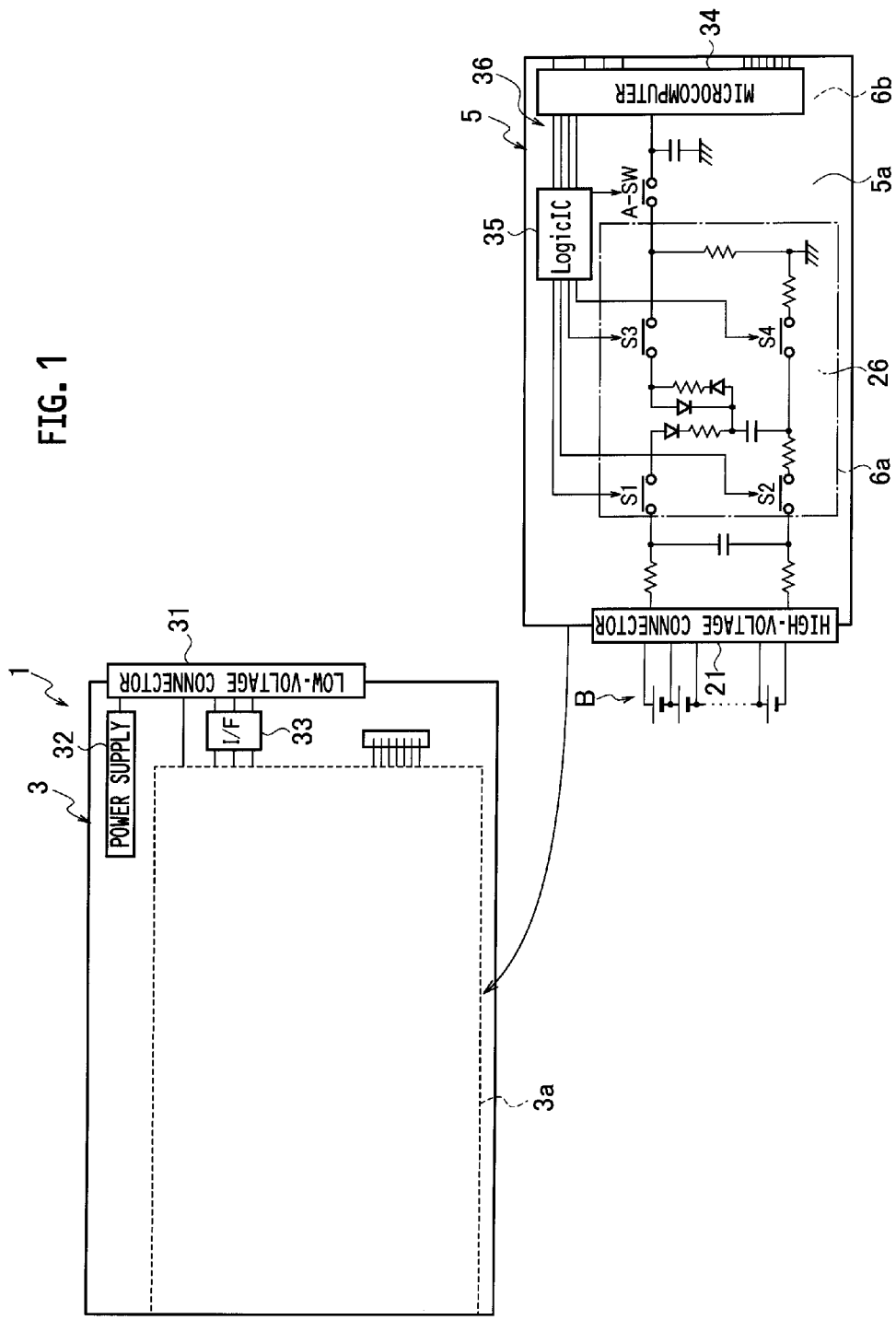
FIG. 1 is a partial exploded plan view of a hybrid circuit according to an embodiment.

As illustrated in FIG. 1, a hybrid circuit 1 according to the embodiment is provided in a voltmeter device which measures an output voltage of a lithium-ion battery B (an external high-voltage element) made of cells, and includes a low-voltage substrate 3 and a substrate-shaped hybrid integrated circuit 5.

Mounted on the low-voltage substrate 3 are, for example, a low-voltage connector 31 (a connector for a low-voltage system) to be connected to an ECU (electronic control unit, equivalent to an external low-voltage element) installed in a vehicle (not illustrated), a power supply 32 which supplies electricity to the low-voltage connector 31, and an interface 33 connected to the low-voltage connector 31.

In the low-voltage substrate 3, a hybrid integrated circuit mounting area 3a is provided where the hybrid integrated circuit 5 can be mounted by being stacked thereon.

On an upper surface 5a of the hybrid integrated circuit 5 which has a rectangular shape in plan view (a surface of the hybrid integrated circuit on the opposite side of the surface of the same which faces the low-voltage substrate), a high-voltage system mounting area 6a is provided in which a high-voltage circuit and a part of a low-voltage circuit are mounted, and a low-voltage system mounting area 6b is provided in which the remaining part of the low-voltage circuit is mounted.

Figure 2A:
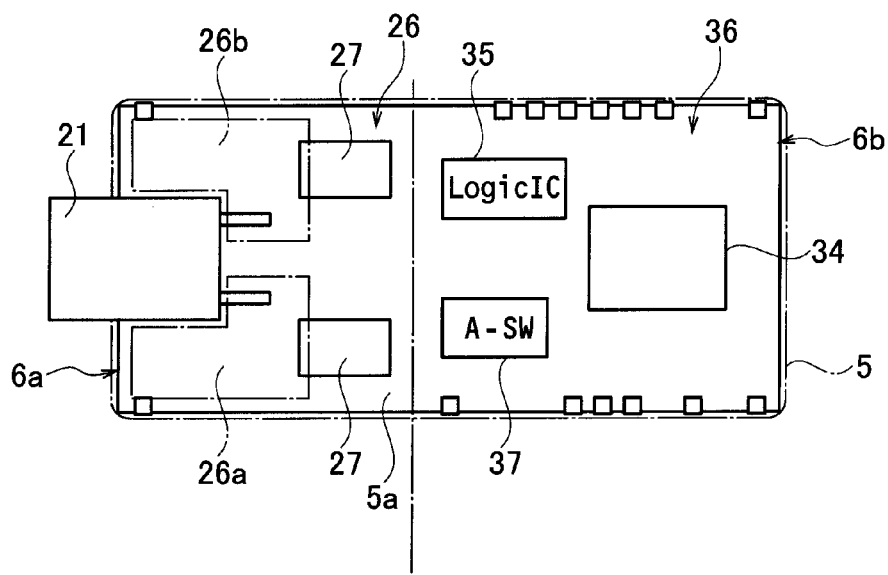
FIG. 2A is a plan view of a hybrid integrated circuit according to the embodiment.
Figure 2B:
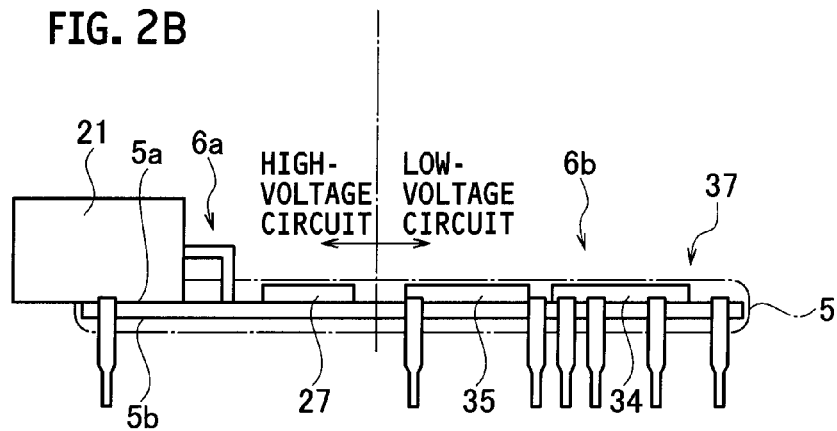
FIG. 2B is a side view of the hybrid integrated circuit according to the embodiment.

As illustrated in FIGS. 2A and 2B, in the hybrid integrated circuit 5, the high-voltage system mounting area 6a is provided in one of two sides which face each other in the longitudinal direction thereof, and the low-voltage system mounting area 6b is provided on the other of the two sides.

In the high-voltage system mounting area 6a, a voltmeter 26 (high-voltage circuit) for measuring an output voltage of the lithium-ion battery B is mounted. Also, in the high-voltage system mounting area 6a, a high-voltage connector 21 (a connector for a high-voltage system) is mounted to connect the high-voltage circuit to each cell of the lithium ion battery B.

In the low-voltage system mounting area 6b, a control unit 36 for controlling operations of the high-voltage circuit is mounted as one of the constituents of the low-voltage circuit. The control unit 36 includes a microcomputer 34 operated by the power supply 32, a logic IC 35 which turns on/off switches S1 to S4 provided in the voltmeter 26 according to an control signal outputted from the microcomputer 34, and an analog switch (A-SW) 37 which turns on/off an input voltage in order to prevent a voltage of a predetermined amount or larger from being inputted into the microcomputer 34.

The hybrid integrated circuit 5 on which the voltmeter 26, the control unit 36, and the high-voltage connector 21 are mounted is stacked on top of the low-voltage substrate 3 on which the low-voltage connector 31, the power supply 32, and the interface 33 are mounted. Hence, an area required for arranging the low-voltage substrate 3 of the hybrid circuit 1 does not become larger than a case where all the constituent elements of the hybrid circuit 1 are mounted on the low-voltage substrate 3. Further, since the voltmeter 26 is mounted on the hybrid integrated circuit 5, a short-circuit fault due to a foreign matter contaminating the voltmeter 26 can be avoided.

Further, the control unit 36, the high-voltage connector 21, and the voltmeter 26 are mounted on the hybrid integrated circuit 5, which makes the hybrid integrated circuit 5 be a single component on its own. Therefore, the hybrid integrated circuit 5 can be sold as a single item. Furthermore, by replacing the hybrid integrated circuit 5 or the low-voltage substrate 3 with a different component, the specification of the hybrid circuit 1 can be changed. Thus, when there is a design change in the hybrid circuit 1, the change can be made only by replacing the hybrid integrated circuit 5 or the low-voltage substrate 3 without changing the entire hybrid circuit 1. This makes it possible to provide the hybrid circuit 1 having the high-voltage circuit and the low-voltage circuit which are versatile.

Moreover, the hybrid integrated circuit 5 is formed by molding, so noise immunity thereof can be improved.

Yet further, the high-voltage connector 21 and the voltmeter 26 are located on one of the two sides of the hybrid integrated circuit 5 which face each other in the longitudinal direction, and the control unit 36 is located on the other of the two sides. With this arrangement, the high-voltage connector 21 and the voltmeter 26 serving as the constituent elements of the high-voltage circuit, and the control unit 36 which is a part of the constituent elements of the low-voltage circuit can have a sufficient insulation distance therebetween. Hence, it becomes possible to prevent short circuit from happening due to a potential difference between the high-voltage connector 21 and the voltmeter 26, and the control unit 36.

Next, the mounting structure of the hybrid integrated circuit of the hybrid circuit 1 according to the embodiment will be explained in detail with reference to FIGS. 3 and 4.

Figure 3:
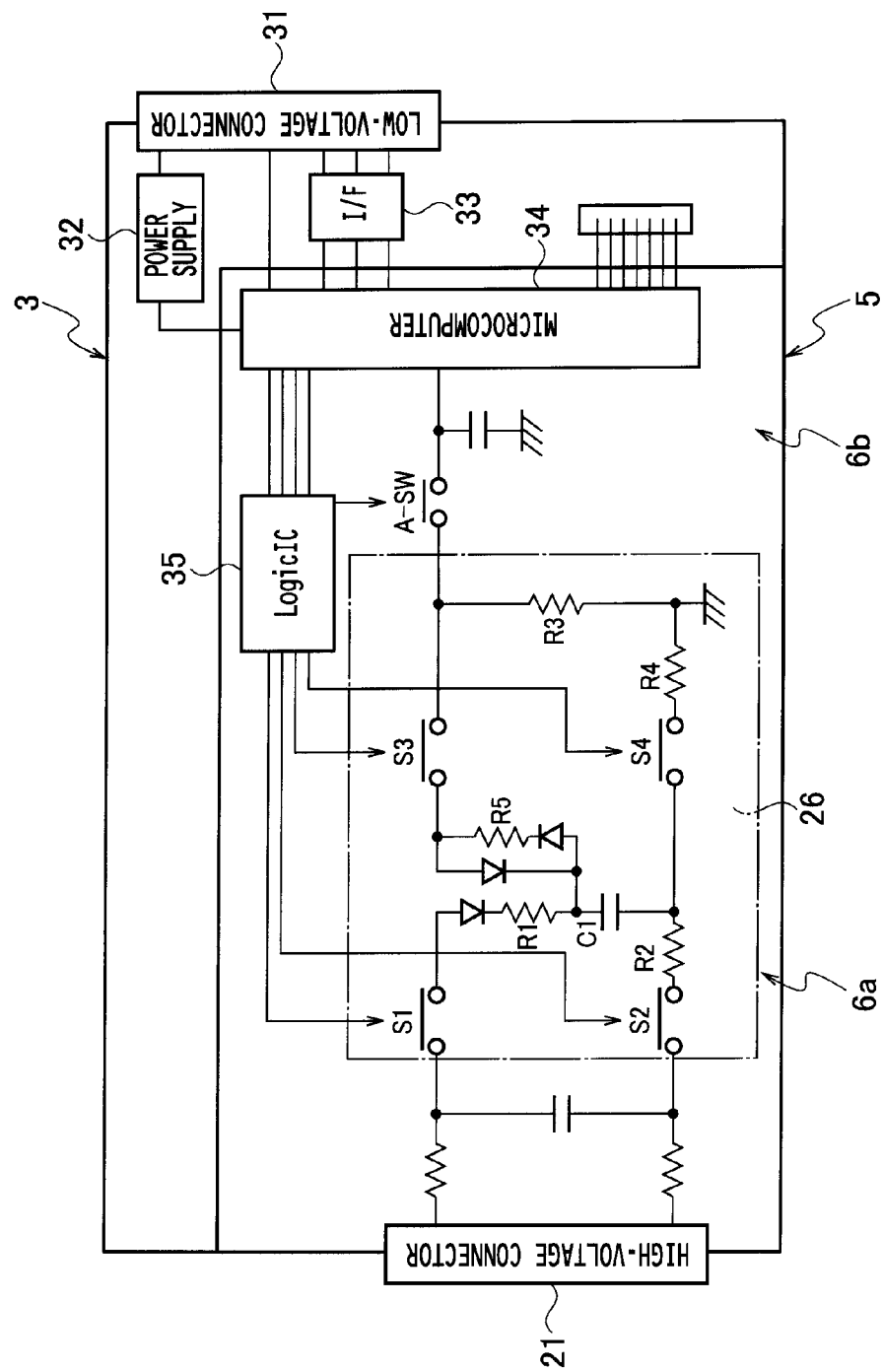
FIG. 3 is a plan view of the hybrid circuit according to the embodiment.

As illustrated in FIG. 3, the voltmeter 26 includes a bipolar flying capacitor C1, the switches S1 and S2 which selectively connect the two poles of the flying capacitor C1 to the positive electrode and the negative electrode of the lithium ion battery B, respectively, and the switches S3 and S4 which selectively connect the two poles of the flying capacitor C1 to a microcomputer 34 and a ground potential part, respectively. Each of the switches 27 (S1 to S4) is a semiconductor switch which is controlled to be on/off by an optical signal, and is structured of, for example, a photo MOSFET.

In the voltmeter 26 illustrated in FIG. 3, when measuring a voltage of the lithium ion battery B, first of all, the switches S1 and S2 are turned on and the switches S3 and S4 are turned off by control of the microcomputer 34. This forms a charging circuit which starts from the positive electrode of the lithium ion battery B through the switch S1, a resistor R1, one end of the flying capacitor C1, the other end of the same, a resistor R2, the switch S2, and to the negative electrode of the lithium ion battery B. Then, in this charging circuit, the flying capacitor C1 is charged at a quantity of electric charge in accordance with the voltage of the lithium ion battery B. One end of the charged flying capacitor C1 becomes a positive electrode, and the other end thereof becomes a negative electrode.

Next, the switches S1 and S2 are turned off and the switches S3 and S4 are turned on by control of the microcomputer 34. This makes the flying capacitor C1 be connected in parallel to a series circuit of a resistor R5, a resistor R3, and a resistor R4. Then, a charging voltage of the flying capacitor C1 is divided into those for the resistors R5, R4 and R3, and an electric potential which is equivalent to a voltage difference between both ends of the resistor R3 is inputted to the microcomputer 34 for measurement. Based on the measured value of the electric potential and the divided voltage ratio of the resistors R5, R4, and R3, the charging voltage of the flying capacitor C1 is measured by the microcomputer 34, thus obtaining measurement of a voltage of the lithium ion battery B.

As explained above, the voltmeter 26 includes a positive electrode side portion 26a (the switch S1, the resistor R1, and one end of the flying capacitor C1) connected to the positive electrode of the lithium ion battery B by control of the microcomputer 34, and a negative electrode side portion 26b (the other end of the flying capacitor C1, the resistor R2, and the switch S2) connected to the negative electrode of the lithium ion battery B by control of the microcomputer 34.

Figure 4:
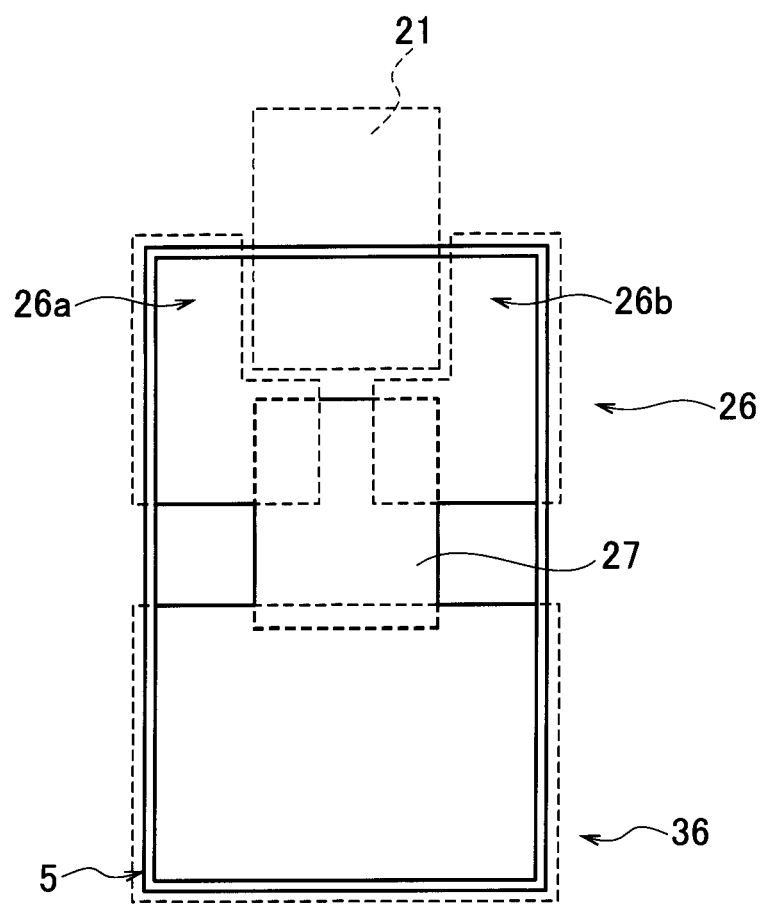
FIG. 4 is a circuit layout view of the hybrid integrated circuit according to the embodiment.

Then, as illustrated in FIG. 4, the positive electrode side portion 26a of the voltmeter 26 is arranged on one of the two sides of the hybrid integrated circuit 5 which face each other in a direction which is not the longitudinal direction thereof, and the negative electrode side portion 26b of the voltmeter 26 is arranged on the other of the two sides. Because of this structure, a sufficient insulation distance can be secured between the positive electrode side portion 26a and the negative electrode side portion 26b. This makes it possible to prevent occurrence of short circuit due to a potential difference between the positive electrode side portion 26a and the negative electrode side portion 26b.

Also, as illustrated in FIG. 4, the semiconductor switches 27 (S1 to S4), which are controlled to be switched on/off by the optical signal, are arranged between the voltmeter 26 and the control unit 36. The semiconductor switches 27 (S1 to S4) controlled to be switched on/off by the optical signal have portions which are electrically insulated from each other. Since there are insulated portions between the voltmeter 26 and the control unit 36, an electric discharge route is blocked between the voltmeter 26 and the control unit 36. Thus, insulation between the voltmeter 26 and the control unit 36 can be ensured.

The semiconductor switches 27 (S1 to S4) are arranged between the positive electrode side portion 26a and the negative electrode side portion 26b of the voltmeter 26. The semiconductor switches 27 (S1 to S4) controlled to be switched on/off by the optical signal have portions which are electrically insulated from each other. Since there are such insulated portions between the positive electrode side portion 26a and the negative electrode side portion 26b of the voltmeter 26, an electric discharge route is blocked between the positive electrode side portion 26a and the negative electrode side portion 26b of the voltmeter 26. Thus, insulation between the positive electrode side portion 26a and the negative electrode side portion 26b of the voltmeter 26 can be ensured.

As mentioned above, the hybrid circuit 1 according to the embodiment is arranged in a way that the hybrid integrated circuit 5, on which the constituent elements of the high-voltage circuit that are the high-voltage connector 21 and the voltmeter 26, and the control unit 36 that is a constituent element of the low-voltage circuit are mounted, is stacked on the low-voltage substrate 3 on which the low-voltage connector 31, the power supply 32, and the interface 33 are mounted. Therefore, an area required for locating the low-voltage substrate 3 of the hybrid circuit 1 does not become larger than a case where all the constituent elements of the hybrid circuit 1 are mounted on a single substrate.

Furthermore, since the voltmeter 26 is mounted on the hybrid integrated circuit 5, a short-circuit fault due to a foreign matter mixed in can be prevented.

Yet further, the voltmeter 26, the control unit 36 for controlling an operation of the voltmeter 26, and the high-voltage connector 21 for connecting the lithium ion battery B to the voltmeter 26 are mounted on the hybrid integrated circuit 5. Hence, by replacing the hybrid integrated circuit 5 or the low-voltage substrate 3 with something else, it becomes possible to change the specification of the hybrid circuit 1. This means that, when there is a design change of the hybrid circuit 1, the change can be made only by replacing the hybrid integrated circuit 5 or the low-voltage substrate 3 without changing the entire hybrid circuit 1. This makes it possible to provide the hybrid circuit 1 having the high-voltage circuit and the low-voltage circuit which are versatile.

Thus, in accordance with the hybrid circuit 1 according to the embodiment, the hybrid circuit 1 can be provided which prevents an increase in a layout area and occurrence of short circuit and has versatile high-voltage circuit and low-voltage circuit.

Yet further, in the hybrid circuit 1 according to the embodiment, the voltmeter 26 is located on one of the two sides of the hybrid integrated circuit 5 which face each other in the longitudinal direction thereof, and the control unit 36 is located on the other of the two sides. Therefore, a sufficient insulation distance can be secured between the voltmeter 26 and the control unit 36. This makes it possible to prevent short circuit from happening due to a potential difference between the voltmeter 26 and the control unit 36.

Furthermore, in the hybrid circuit 1 according to the embodiment, the semiconductor switches 27 (S1 to S4), which are controlled to be switched on/off by the optical signal, are arranged between the voltmeter 26 and the control unit 36. The semiconductor switches 27 (S1 to S4) controlled to be switched on/off by the optical signal have portions which are electrically insulated from each other. Since there are such insulated portions between the voltmeter 26 and the control unit 36, the electric discharge route is blocked between the voltmeter 26 and the control unit 36. Thus, insulation between the voltmeter 26 and the control unit 36 can be ensured.

Also, in the hybrid integrated circuit 1 according to the embodiment, the positive electrode side portion 26a of the voltmeter 26, which is connected to the positive electrode of the lithium ion battery B by control of the microcomputer 34, is arranged on one of the two sides of the hybrid integrated circuit 5 which face each other in a direction which is not the longitudinal direction thereof, and the negative electrode side portion 26b of the voltmeter 26, which is connected to the negative electrode of the lithium ion battery B by control of the microcomputer 34, is arranged on the other of the two sides. With this structure, a sufficient insulation distance can be secured between the positive electrode side portion 26a and the negative electrode side portion 26b of the voltmeter 26. Therefore, short circuit can be prevented from happening due to a potential difference between the positive electrode side portion 26a and the negative electrode side portion 26b of the voltmeter 26.

Yet further, in the hybrid circuit 1 according to the embodiment, the semiconductor switches 27 (S1 to S4), which are controlled to be switched on/off by the optical signal, are arranged between the positive electrode side portion 26a and the negative electrode side portion 26b of the voltmeter 26. The semiconductor switches 27 (S1 to S4) controlled to be switched on/off by the optical signal have portions which are electrically insulated from each other. Since there are such insulated portions between the positive electrode side portion 26a and the negative electrode side portion 26b of the voltmeter 26, the electric discharge route is blocked between the positive electrode side portion 26a and the negative electrode side portion 26b of the voltmeter 26. This makes it possible to provide the safe hybrid circuit which ensures insulation between the positive electrode side portion 26a and the negative electrode side portion 26b of the voltmeter 26.

Yet further, in the hybrid circuit 1 according to the embodiment, the entire high-voltage circuit is packaged as the hybrid integrated circuit 5 and insulated from the circumference by mold forming. Thus, an improvement in insulation against the low-voltage circuit side and an enhanced safety in terms of prevention of electrical shock during maintenance and so forth can be achieved. Moreover, the entire high-voltage circuit including the high-voltage connector 21 is excluded from elements to be mounted on the low-voltage substrate 3. Therefore, downsizing of the low-voltage substrate 3 can be achieved. In addition, since it is not necessary to mix the high-voltage circuit with the low-voltage circuit on the low-voltage substrate 3, component mounting efficiency of the low-voltage substrate 3 can be improved.

The hybrid circuit 1 according to the embodiment has been described with reference to the drawings, but the present invention is not limited thereto, and the structure of each part thereof may be replaced by a different given structure having a similar function.

For example, explained in the embodiment above was the case where the high-voltage connector 21 is located on the upper surface of the hybrid integrated circuit 5 together with the components including the voltmeter 26 and the control unit 36 as illustrated in FIGS. 2A and 2B.

Figure 5A:
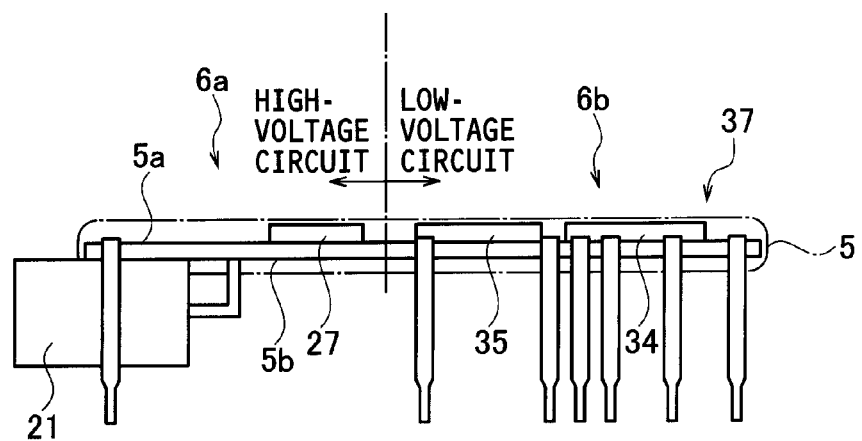
FIGS. 5A and 5B are side views illustrating modification examples of layout of a high-voltage connector in the hybrid integrated circuit illustrated in FIG. 2B.

However, as illustrated in the side view of FIG. 5A, the high-voltage connector 21 may also be located on a bottom surface 5b of the hybrid integrated circuit 5 which faces the low-voltage substrate 3 (the surface of the hybrid integrated circuit facing the low-voltage substrate). With this arrangement, no space is needed to arrange the high-voltage connector 21 on the upper surface 5a, thus enabling to effectively utilize the upper surface 5a for arranging the voltmeter 26 and the control unit 36.

Figure 5B:
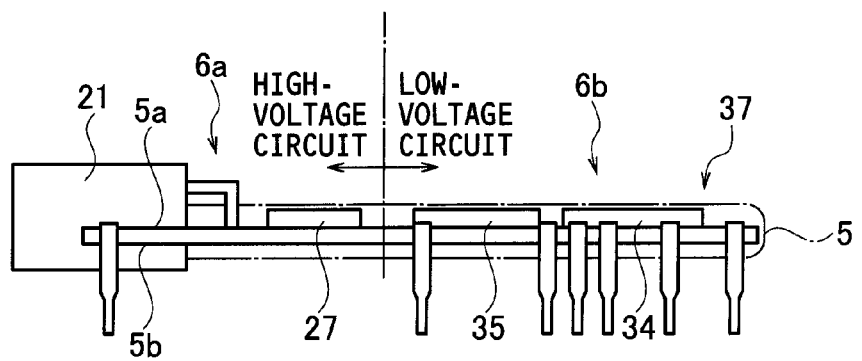

Alternately, as depicted in FIG. 5B, the high-voltage connector 21 may be arranged across the both surfaces of the hybrid integrated circuit 5 so that a part of the high-voltage connector 21 comes on the upper surface side of the hybrid integrated circuit 5 and the other part thereof comes on the bottom surface side of the hybrid integrated circuit 5 by fitting the high-voltage connector 21 to a notch made in the substrate portion of the hybrid integrated circuit 5. With this arrangement, the low-voltage substrate 3 and the hybrid insulated circuit 5 can be arranged with an interval shorter than the height of the high-voltage connector 21, enabling to reduce the size of the entire hybrid circuit 1.

Figure 6:
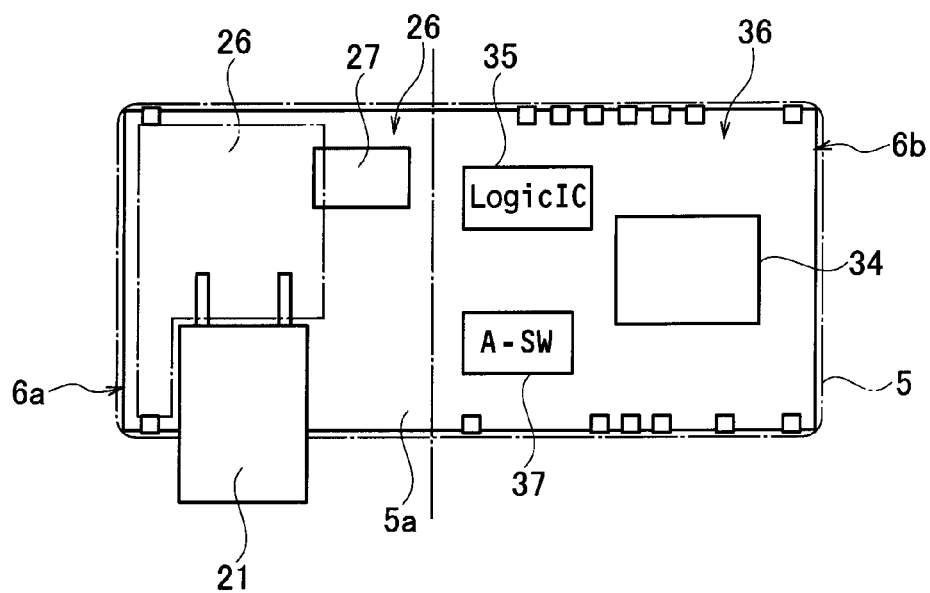
FIG. 6 is a plan view illustrating a modification example of layout of the high-voltage connector in the hybrid integrated circuit illustrated in FIG. 2B.

Moreover, as illustrated in the plan view of FIG. 6, the high-voltage connector 21 may be arranged on one of two sides of the hybrid integrated circuit 5 which face each other in a direction different from the longitudinal direction of the hybrid integrated circuit 5, instead of one of the two sides of the hybrid integrated circuit 5 in the longitudinal direction. In this case, the high-voltage connector 21 can also be arranged on the side of the bottom surface 5b of the hybrid integrated circuit 5 or across the upper surface 5a and the bottom surface 5b of the hybrid integrated circuit 5 by fitting the high-voltage connector 21 into a notch made in the substrate portion of the hybrid integrated circuit 5, as illustrated in FIGS. 5A and 5B.

Moreover, in the aforementioned embodiment, the hybrid circuit 1 which measures a voltage of each cell of the lithium ion battery B was explained as an example. However, the present invention can be applied to a wide range of fields as a structure for mounting a hybrid circuit having a mixture of a high-voltage circuit with a high power supply voltage and a low-voltage circuit with a low power supply voltage on a substrate.

For example, the present invention can also be applied to a hybrid circuit for monitoring a power supply of a high-voltage battery in general, including a nickel hydride assembled battery and a fuel cell. Also, besides power supply monitoring, the present invention can be applied to a hybrid circuit for an electrical leakage sensor, for example. Moreover, the hybrid circuit according to the embodiment is not limited to utilization for in-vehicle batteries or batteries not used in vehicles, and can be widely applied as a hybrid circuit for various purposes in high-voltage power supply systems.

What is claimed is:

1. A hybrid circuit including a high-voltage circuit and a low-voltage circuit having different power supply voltages from each other, comprising:
   a low-voltage substrate on which a connector for a low-voltage system for electrically connecting an external low-voltage element to the low-voltage circuit is mounted; and
   a substrate-shaped hybrid integrated circuit which can be stacked on the low-voltage substrate, wherein
   the low-voltage circuit includes a control unit which controls an operation of the high-voltage circuit, and
   the control unit, the high-voltage circuit, and a connector for a high-voltage system for electrically connecting an external high-voltage element to the high-voltage circuit are mounted on the hybrid integrated circuit.

2. The hybrid circuit according to claim 1, wherein at least part of the connector for the high-voltage system is arranged on a surface side of the hybrid integrated circuit opposed to a surface of the same which faces the low-voltage substrate, in a direction of an interval between the low-voltage substrate and the hybrid integrated circuit.

3. The hybrid circuit according to claim 1, wherein the high-voltage circuit and the connector for the high-voltage system are arranged on one of a pair of sides of the hybrid integrated circuit which face each other, and the control unit is arranged on the other of the pair of sides.

4. The hybrid circuit according to claim 1, wherein the hybrid integrated circuit is mounted on the low-voltage substrate.

5. The hybrid circuit according to claim 1, wherein a wired connection, between the high-voltage circuit and the low-voltage circuit, is mounted on the low-voltage substrate.

6. The hybrid circuit according to claim 5, wherein the high-voltage circuit is a voltmeter.

7. The hybrid circuit according to claim 6, wherein the voltmeter is located on a side of the low-voltage substrate opposite of a side of the low-voltage substrate having the control unit mounted thereupon.

8. The hybrid circuit according to claim 6, wherein the control unit comprises:
    a microcomputer powered by a low-voltage power supply;
    a logic integrated circuit (IC) configured to turn on and off switches of the voltmeter in according to a control signal received by the logic IC from the microcomputer; and
    an analog switch configured to turn on and off an input voltage to the microcomputer.

* * * * *